(12) United States Patent 　 (10) Patent No.: 　 US 12,625,001 B2
Winzell 　 (45) Date of Patent: 　 May 12, 2026

(54) THERMOMETRIC CAMERA COMPRISING A BOLOMETER SENSOR AND METHOD OF DETERMINING A TEMPERATURE OF AN OBJECT IN MOTION BY A THERMOMETRIC CAMERA

(71) Applicant: Axis AB, Lund (SE)

(72) Inventor: Thomas Winzell, Lund (SE)

(73) Assignee: Axis AB, Lund (SE)

( * ) Notice: Subject to any disclaimer, the term of this patent is extended or adjusted under 35 U.S.C. 154(b) by 171 days.

(21) Appl. No.: 18/733,000

(22) Filed: Jun. 4, 2024

(65) Prior Publication Data

US 2025/0027819 A1 　 Jan. 23, 2025

(30) Foreign Application Priority Data

Jul. 20, 2023 　 (EP) ..................................... 23186761

(51) Int. Cl.
G01J 5/10 　 (2006.01)
G01J 5/00 　 (2022.01)
(Continued)

(52) U.S. Cl.
CPC ............. G01J 5/0022 (2013.01); G01J 5/025 (2013.01); G01J 5/026 (2013.01); G01J 5/10 (2013.01);
(Continued)

(58) Field of Classification Search
CPC ........ G01J 5/0022; G01J 5/0025; G01J 5/025; G01J 5/026; G01J 5/10; G01J 5/20; G01J 5/48; G01J 5/80
(Continued)

(56) References Cited

U.S. PATENT DOCUMENTS 5,600,143 A * 　 2/1997 　 Roberts ..................... G01J 5/30
　 348/E5.081
5,675,149 A 　 10/1997 　 Wood et al.
(Continued)

FOREIGN PATENT DOCUMENTS

CN 　 104867330 A 　 8/2015
CN 　 108327743 A 　 7/2018
(Continued)

OTHER PUBLICATIONS

Oswald-Tranta, "Temperature reconstruction of infrared images with motion deblurring." Journal of Sensors and Sensor Systems. 7. 13-20. (2018).
(Continued)

*Primary Examiner* — Allen C. Ho
(74) *Attorney, Agent, or Firm* — Volpe Koenig

(57) ABSTRACT
A thermometric camera for determining a temperature of an object in motion comprises a bolometer sensor and circuitry. The bolometer sensor captures a sequence of image frames of the object while the object is moving. The circuitry executes: an object identifying function configured to identify an area corresponding to the object in each image frame of a series of image frames among the sequence of image frames; a combining function configured to combine the identified areas from each image frame in the series of image frames into a stacked image of the object, wherein pixel values in the stacked image of the object are estimated as a sum of pixel values of the corresponding pixels in the image frames in the series of image frames; and a temperature determining function configured to determine the temperature of the object in motion from pixel values in the stacked image of the object.

9 Claims, 3 Drawing Sheets

(51) Int. Cl.

| | |
|---|---|
| *G01J 5/02* | (2022.01) |
| *G01J 5/20* | (2006.01) |
| *G01J 5/24* | (2006.01) |
| *G01J 5/48* | (2022.01) |
| *G01J 5/80* | (2022.01) |

(52) U.S. Cl.
CPC . *G01J 5/20* (2013.01); *G01J 5/24* (2013.01); *G01J 5/48* (2013.01); *G01J 5/80* (2022.01); *G01J 2005/0077* (2013.01)

(58) Field of Classification Search
USPC ..... 250/330, 332, 334, 338.1; 382/103, 107, 382/173, 181, 190, 195
See application file for complete search history.

(56) References Cited

U.S. PATENT DOCUMENTS

| | | | | |
|---|---|---|---|---|
| 8,134,126 | B2 * | 3/2012 | Tadano ..................... | G01J 5/48 382/237 |
| 8,357,898 | B2 * | 1/2013 | Weisbach ............... | H04N 23/23 250/332 |
| 8,478,480 | B2 * | 7/2013 | Mian ................... | G01M 17/007 348/148 |
| 9,207,708 | B2 * | 12/2015 | Simolon .............. | H04N 25/677 |
| 9,292,909 | B2 | 3/2016 | Högasten et al. | |
| 9,607,388 | B2 * | 3/2017 | Lin ........................... | G06T 7/74 |
| 9,674,458 | B2 * | 6/2017 | Teich .................... | H04N 23/21 |
| 10,788,373 | B2 * | 9/2020 | Kar .......................... | G01J 5/025 |
| 10,789,688 | B2 * | 9/2020 | Winzell ................. | H04N 23/71 |
| 10,834,337 | B2 * | 11/2020 | Wadelius ............... | H04N 23/73 |
| 11,539,895 | B1 * | 12/2022 | Seets .................. | H04N 23/6811 |
| 11,910,001 | B2 * | 2/2024 | Mangan ......... | H04N 21/234381 |
| 11,988,560 | B2 * | 5/2024 | Boudou ................. | G01J 5/024 |
| 2009/0018721 | A1 | 1/2009 | Mian et al. | |
| 2011/0297828 | A1 | 12/2011 | Weisbach et al. | |
| 2019/0061791 | A1 | 2/2019 | Yaktine et al. | |

FOREIGN PATENT DOCUMENTS

| | | |
|---|---|---|
| JP | 2007028349 A | 2/2007 |
| KR | 101504008 B1 | 3/2015 |
| WO | 2023/119111 A1 | 6/2023 |

OTHER PUBLICATIONS

Extended European Search Report dated Jan. 29, 2024 for European Patent Application No. 23186761.5.

* cited by examiner

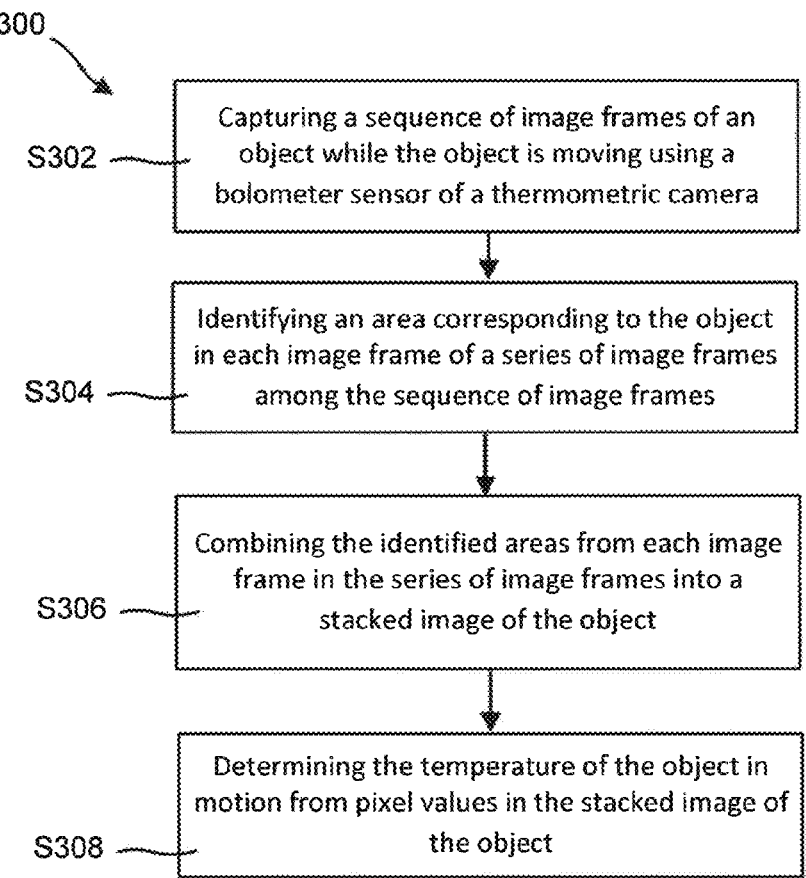

300

S302 — Capturing a sequence of image frames of an object while the object is moving using a bolometer sensor of a thermometric camera S304 — Identifying an area corresponding to the object in each image frame of a series of image frames among the sequence of image frames S306 — Combining the identified areas from each image frame in the series of image frames into a stacked image of the object S308 — Determining the temperature of the object in motion from pixel values in the stacked image of the object

*FIG. 3*

THERMOMETRIC CAMERA COMPRISING A BOLOMETER SENSOR AND METHOD OF DETERMINING A TEMPERATURE OF AN OBJECT IN MOTION BY A THERMOMETRIC CAMERA

TECHNICAL FIELD

The present invention relates to a thermometric camera for determining a temperature of an object in motion. Additionally, a method of determining a temperature of an object in motion using a thermometric camera is covered by the invention.

BACKGROUND

In many situations, thermometric cameras are excellent devices for automatic detection and recognition surveillance. Recently, there has been focus on making thermometric cameras for various temperature applications. One application is to monitor vehicles that pass into certain critical road passages such as tunnels, bridges etc., with the purpose to screen for overheated breaks etc., preventing fire incidents. Doing so, temperature thresholds for hazardous vs. non-hazardous events can be monitored. However, such monitoring typically requires that vehicles slow down or even come to a full stop for accurate measurements. This since measurements with a thermometric camera typically will suffer from motion blur in case the object is moving. Furthermore, thermometric cameras have a finite thermal resolution and need to be subjected to thermal radiation for a certain minimum time in order to sense a temperature.

SUMMARY OF THE INVENTION

In view of the above, it is an object of the present invention to provide a thermometric camera and a method for determining a temperature of an object in motion.

According to a first aspect, a method of determining a temperature of an object in motion using a thermometric camera is provided. The thermometric camera is preferably stationarily arranged. The method comprises: capturing a sequence of image frames of the object while the object is moving using a bolometer sensor of the thermometric camera; identifying an area corresponding to the object in each image frame of a series of image frames among the sequence of image frames; combining the identified areas from each image frame in the series of image frames into a stacked image of the object, wherein pixel values in the stacked image of the object are estimated as a sum of pixel values of the corresponding pixels in the image frames in the series of image frames; and determining the temperature of the object in motion from pixel values in the stacked image of the object.

Such a method of determining a temperature of an object in motion using a thermometric camera facilitates temperature determinations of objects in motion. It is, e.g., safeguarded that enough statistics on thermal radiation for the object is used in order to arrive at a reliable temperature determination for the object. By this method, monitoring for hazardous versus non-hazardous events based on temperature of objects may be provided. As an example, breaks of a train may be monitored during traveling of the train without the need for the train to slow down or much less stop.

The method may further comprise: estimating, from image frames in the sequence of image frames of the object, a pixel velocity of the object in motion; calculating, from the pixel velocity of the object and a frame integration time, a pixel exposure time for the image frames of the sequence of image frames; and determining a number of image frames to be used for the series of image frames based on the calculated pixel exposure time and a thermal time constant of the bolometer sensor.

The method may further comprise determining the thermal time constant of the bolometer sensor by one or more of: obtaining it as a value given by the manufacturer of the bolometer sensor, and a calibration of the thermometric camera upon installation.

The method may further comprise selecting the series of image frames among the sequence of images as image frames depicting the object in a center portion of a field of view of the thermometric camera.

The method may further comprise: estimating, from image frames in the sequence of images of the object, an angular distance moved during the total integration time, $\alpha$, of the object in motion; estimating blurring of radiance due to motion using a module transfer function, $$MTF = \frac{\sin \pi \alpha f}{\pi \alpha f},$$

where f is a spatial frequency; and correcting pixels of the series of image frames based on the estimated blurring. The angular distance moved during the total integration time can be expressed as $\alpha = v \times t / D$, where v is the velocity, t the integration time and D is the distance between the object and the camera. D may also be scaled with the angle $\beta$ from the optical central axis, i.e. $D \cos \beta$. This angle $\beta$ is easily estimated as the field of view is known as a function of pixel position.

According to a second aspect, a non-transitory computer-readable storage medium is provided. The non-transitory computer-readable storage medium having stored thereon computer code instructions being executable by a device having processing capabilities. The computer code instructions when being executed are configured to instruct the device to: receive a sequence of image frames of an object in motion captured using a bolometer sensor of a static thermometric camera; identify an area corresponding to the object in each image frame of a series of image frames among the sequence of images; combine the identified areas from each of the image frames in the series of image frames into a stacked image of the object, wherein pixel values in the stacked image of the object are estimated as a sum of pixel values of the corresponding pixels in the image frames in the series of image frames; and determine the temperature of the object in motion from pixel values in the stacked image of the object.

The computer code instructions when being executed may further be configured to instruct the device to: estimate, from image frames in the sequence of image frames of the object, a pixel velocity of the object in motion; calculate, from the pixel velocity of the object and a frame integration time, a pixel exposure time for the image frames of the sequence of image frames; and determine a number of image frames to be used for the series of image frames based on the calculated pixel exposure time and a thermal time constant of the bolometer sensor.

The above mentioned features of the method, when applicable, apply to this second aspect as well. In order to avoid undue repetition, reference is made to the above.

According to a third aspect a thermometric camera for determining a temperature of an object in motion is provided. The thermometric camera comprises: a bolometer sensor configured to capture a sequence of image frames of the object while the object is moving; and circuitry. The circuitry is configured to execute: an object identifying function configured to identify an area corresponding to the object in each image frame of a series of image frames among the sequence of image frames; a combining function configured to combine the identified areas from each image frame in the series of image frames into a stacked image of the object, wherein pixel values in the stacked image of the object are estimated as a sum of pixel values of the corresponding pixels in the image frames in the series of image frames; and a temperature determining function configured to determine the temperature of the object in motion from pixel values in the stacked image of the object.

The combining function may further be configured to: based on image data in image frames in the sequence of image frames of the object, estimate a pixel velocity of the object in motion; calculate, from the pixel velocity of the object and a frame integration time, a pixel exposure time of the image frames of the sequence of image frames; and determine, based on the pixel exposure time and a thermal time constant of the bolometer sensor, a number of image frames to be used for the series of image frames.

The above-mentioned features of the method, when applicable, apply to this third aspect as well. In order to avoid undue repetition, reference is made to the above.

A further scope of applicability will become apparent from the detailed description given below. However, it should be understood that the detailed description and specific examples are given by way of illustration only.

It is to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

FIG. 3 is a block diagram determining a temperature of an object in motion using a thermometric camera.

DETAILED DESCRIPTION

The present invention will now be described more fully hereinafter with reference to the accompanying drawings, in which currently preferred embodiments of the invention are shown. This invention may, however, be embodied in many different forms.

Figure 1:
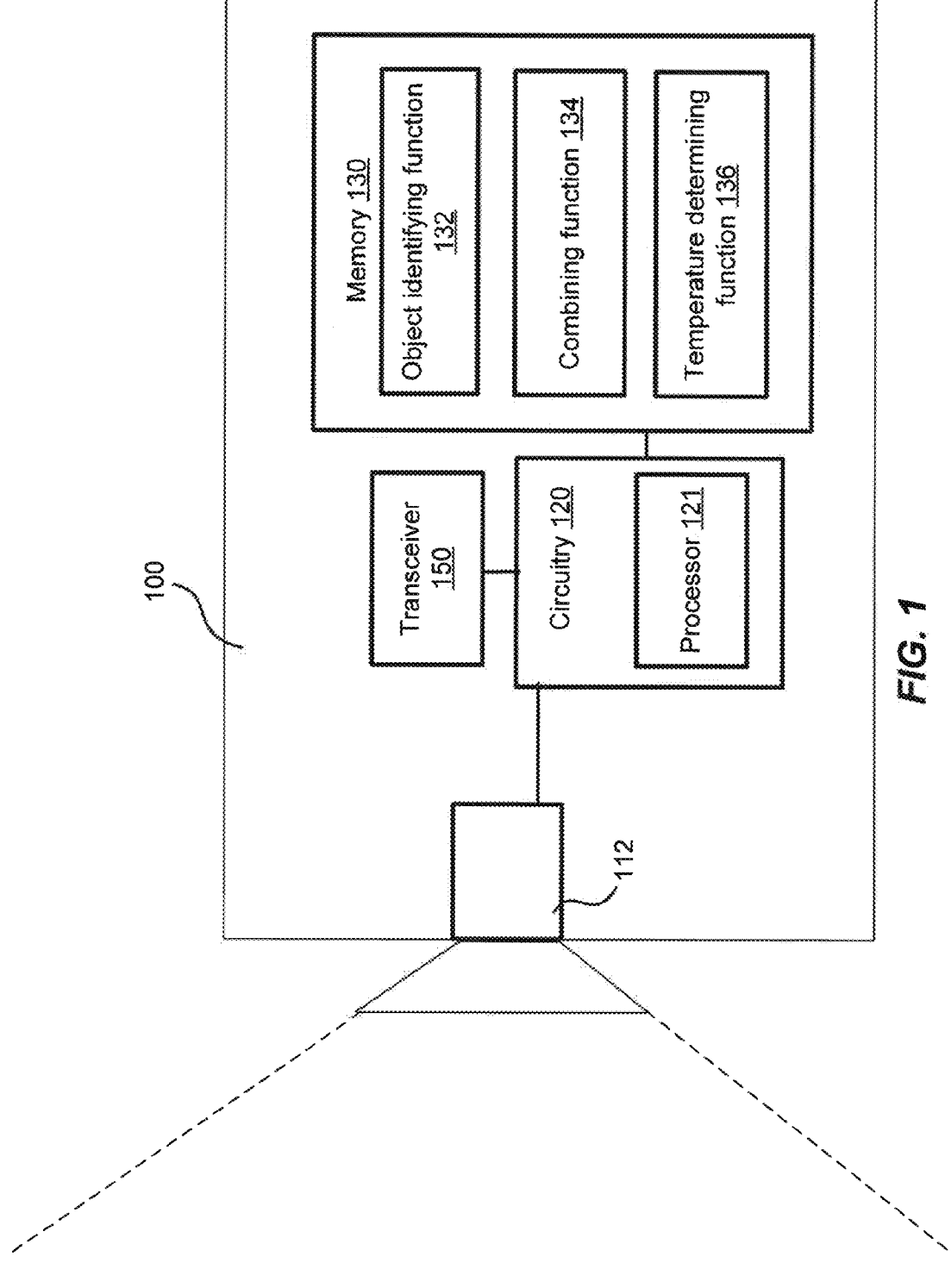
FIG. 1 illustrates a thermometric camera.

FIG. 1 illustrates a thermometric camera 100. The thermometric camera 100 is capable of determining a temperature of an object in motion. The thermometric camera 100 is typically configured to be stationarily arranged. By being stationary arranged it is meant that the thermometric camera 100 arranged at a fixed position. In addition the thermometric camera 100 may be a pan-tilt-zoom camera or a fixed camera having no pan and tilt functionality. Further, the thermometric camera 100 is typically having a fixed zoom setting for a sequence of image frames being captured of an object.

The thermometric camera 100 comprises a bolometer sensor 112 and circuitry 120. It is understood that the thermometric camera 100 may comprise additional components and features such as a power source, a network connection, a display, input means, etc. However, such additional components and features will not be described in any more detail in this disclosure since they do not contribute to the function of the present invention.

The bolometer sensor 112 is configured to capture a sequence of image frames of an object. Especially, the bolometer sensor 112 is configured to capture a sequence of image frames of an object while the object is moving.

Figure 2:
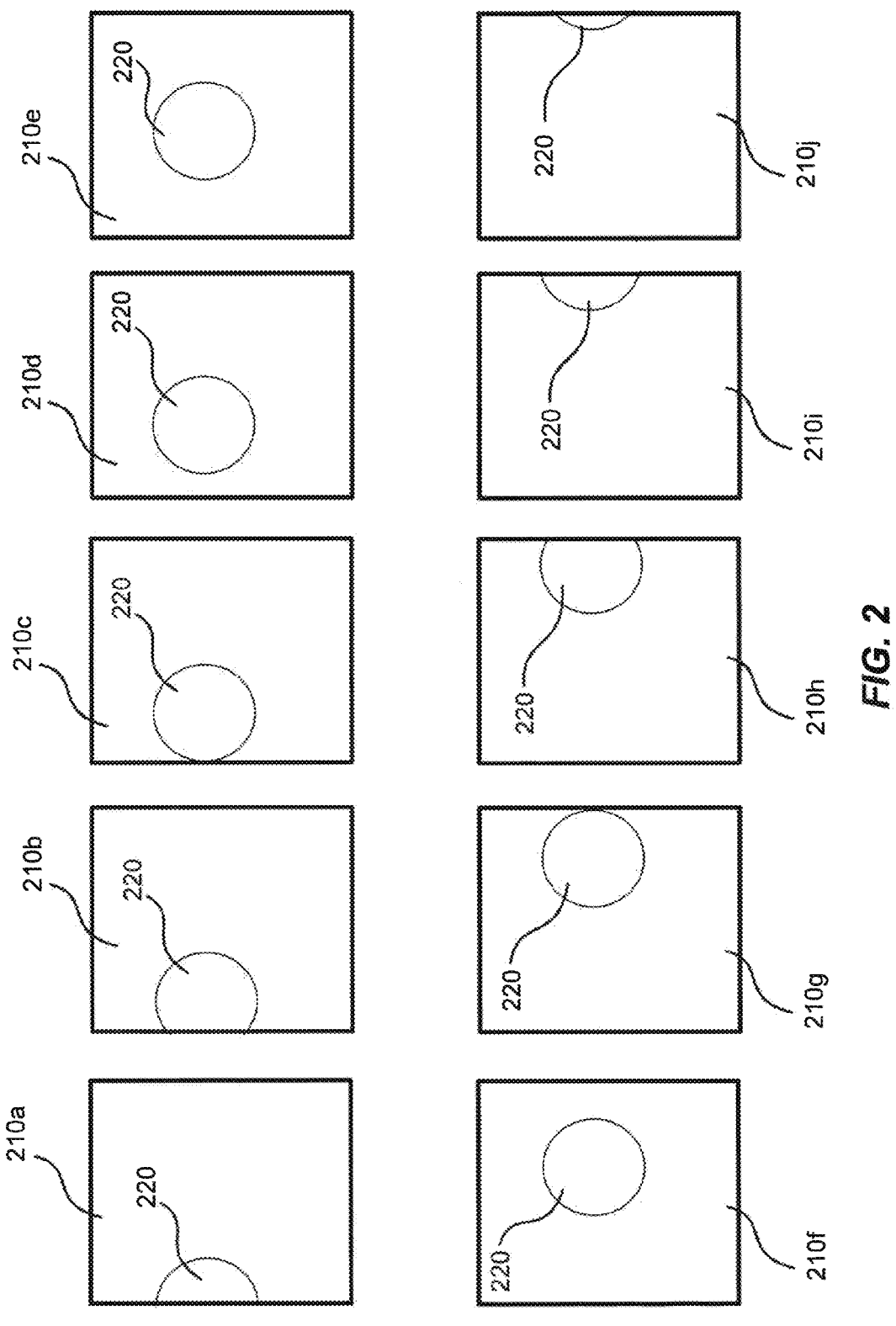
FIG. 2 is a schematic illustration of a sequence of image frames captured by a thermometric camera.

An example of such a sequence of image frames is schematically illustrated in FIG. 2. The sequence comprises a plurality of image frames 210$a$-$j$. Throughout the image frames 210$a$-$j$ an object 220 in motion is schematically illustrated. The object 220 enters the scene depicted in the sequence of image frames from the left, moves through the scene and leaves to the right.

The bolometer sensor 112 comprises a plurality of pixels. The pixels of the bolometer sensor 112 have a finite thermal resolution and need to be subjected to thermal radiation for a certain time in order to sense a temperature. The finite thermal resolution is usually called a thermal time constant, τ, of the bolometer sensor 112. The thermal time constant, τ, is dependent on thermal conductance, G, and heat capacity, C, of the bolometer sensor 112 according to:

$$\tau = \frac{C}{G} \tag{1}$$

The thermal time constant, τ, is typically stated by the bolometer sensor manufacturer and is usually given at 1−1/e≈63% value. It usually has a value of roughly 10-15 milliseconds. Further, the thermal time constant, τ, varies with ambient temperature. Hence, the thermal time constant, τ, may be given in a look-up table for different ambient temperatures. Such a look-up table is typically given by the bolometer sensor manufacturer. Alternatively, the thermal time constant, τ, may be found through calibration of the thermometric camera upon installation of the same. Such calibration may, e.g., be made by making use of the frame integration time. The frame integration time is set to be relatively short, e.g. 1 millisecond, and then with a known scene temperature or shutter flag temperature, the pixel read out signal is integrated until it is equal to a thermometric calibrated value.

Further, the bolometer sensor 112 is set to capture thermal radiation from a scene during a frame integration time before pixel values of the pixels are read out. Such a frame integration time is typically in the order of 10ths of milliseconds. According to one example the bolometer sensor 112 is set to have a frame rate of 30 frames per second. Under such conditions the frame integration time is approximately 30 milliseconds. Accordingly, under such conditions the frame integration time is well above the thermal time constant, τ, and the pixels of the bolometer sensor 112 are subjected to thermal radiation for enough time in order to reliably sense a temperature. However, when the object for which the temperature is to be determined/sensed is in motion, information will be smeared out over a plurality of pixels in the bolometer sensor 112. For example, if the object is moving with a speed of six pixels per frame it means that each pixels has roughly ⅙ of the true signal. In this example the frame rate is set to be 30 frames per second, meaning that the frame integration time is approximately 30 milliseconds. Hence, each pixel is then subjected to thermal radiation from a specific portion of the object for only 5 milliseconds. The time of subjecting a pixel to thermal radiation from a specific portion of the object is here referred to as a pixel exposure time. Accordingly, the pixel exposure time will be below the thermal time constant, τ, and the pixel is not subjected to thermal radiation for enough time in order to have proper statistics to sense a temperature. A way of compensating for the lack of statistics is to upscale the radiance for that pixel by extrapolation and thereby a better radiance/temperature estimation can be done.

However, the inventor of the present invention has realized that determining a temperature of an object in motion using a thermometric camera can be done in another way. This by identifying an area corresponding to the object in each image frame of a series of image frames and stacking them to yield or synthesize a sufficiently long integration time. This way of determining a temperature of an object in motion using a thermometric camera will be discussed in more detail below. However, first some more details on the features of the thermometric camera 100 will be given.

As mentioned above, the thermometric camera 100 comprises circuitry 120. The circuitry 120 is configured to carry out overall control of functions and operations of the thermometric camera 100. The circuitry 120 may include a processor 121, such as a central processing unit, CPU, a graphics processing unit, GPU, a microcontroller, or a microprocessor. The processor 121 is configured to execute program code stored in a memory 130, in order to carry out functions and operations of the thermometric camera 100.

The memory 130 may be one or more of a buffer, a flash memory, a hard drive, a removable medium, a volatile memory, a non-volatile memory, a random access memory, RAM, or another suitable memory unit. In a typical arrangement, the memory 130 may include a non-volatile memory for long term data storage and a volatile memory that functions as system memory for the circuitry 120. The memory 130 may exchange data with the circuitry 120 over a data bus. Accompanying control lines and an address bus between the memory 130 and the circuitry 120 also may be present.

Functions and operations of the thermometric camera 100 may be embodied in the form of executable logic routines (e.g., lines of code, software programs, etc.) that are stored on a non-transitory computer readable medium (e.g., the memory 130) of the thermometric camera 100 and are executed by the circuitry 120 (e.g., using the processor 121). Furthermore, the functions and operations of the thermometric camera 100 may be a stand-alone software application or form a part of a software application that carries out additional tasks related to the thermometric camera 100. The described functions and operations may be considered a method that the corresponding part of the thermometric camera 100 is configured to carry out. Also, while the described functions and operations may be implemented in software, such functionality may as well be carried out via dedicated hardware or firmware, or some combination of hardware, firmware and/or software.

As mentioned above, the inventor of the present invention has realized that compensating for that the pixel exposure time will be below the thermal time constant, τ, when a thermometric camera 100 is used for determining a temperature of an object 220 in motion can be done by identifying an area corresponding to the object in each image frame of a series of image frames and stacking them to yield a sufficiently long integration time. In order to do so, the circuitry 120 of the thermometric camera 100 is configured to execute a number of functions.

The circuitry 120 is configured to execute an object identifying function 132. The object 220 identifying function 132 is configured to identify an area corresponding to the object 220 in motion in each image frame of a series of image frames among a sequence of image frames captured by the bolometer sensor 112. The series of image frames is typically a series of successive image frames. The series of image frames and the sequence of image frames may be the same image frames. However, the series of image frames may be a subset of image frames in the sequence of image frames. A standard motion and/or object detector can be used for identifying pixels belonging to the areas of the different image frames in the series of image frames. The object to be monitored may, e.g., be a wheel of a train or another kind of vehicle.

The circuitry 120 is further configured to execute a combining function 134. The combining function 134 is configured to combine the identified areas from each image frame in the series of image frames into a stacked image of the object. Hence, a combined image of the object is formed by summing pixel values of corresponding pixels in the image frames in the series of image frames. By corresponding pixels in the image frames in the series of image frames is here meant pixels of a same position of the object in the different image frame. That is, pixels corresponding to, for example, a center of the object are identified in the different image frames and then summed. Pixels corresponding to a certain other point of the object may in other examples be identified in the different image frames and then summed.

The combining function 134 may be configured to, based on image data in image frames in the sequence of image frames of the object, estimate a pixel velocity of the object in motion. According to one example, the pixel velocity of the object in motion is estimated to be six (6) pixels per frame. The combining function 134 may then further be configured to, from the pixel velocity of the object in motion and a frame rate of the bolometer sensor 112, calculate a pixel exposure time. In the above example the frame rate of the bolometer sensor 112 was set to be 30 frames per second, giving that a frame integration time for each frame is approximately 30 milliseconds. Hence, the pixel exposure time is then calculated to be 30/6 milliseconds=5 milliseconds. The combining function 134 may then further be configured to, based on the calculated pixel exposure time and a thermal time constant, τ, of the bolometer sensor 112, determine a number of image frames to be used for the series of image frames. As exemplified above, the thermal time constant, τ, of the bolometer sensor 112 may be 15 milliseconds. If so, the determined number of image frames to be used for the series of image frames is 15/5=3 image frames. This determined number of image frames to be used for the series of image frames may be seen as a minimum number of image frames to be used for the series of image frames. Indeed, more image frames than this minimum number of image frames can be used.

Pixel values in the stacked image of the object 220 can be estimated as a weighted sum of pixel values of the corresponding pixels in the image frames in the series of image frames. A weight used in the weighted sum is set to vary between 0 and 1. In case the number of image frames used for forming the stacked image of the object 220 is set to be the minimum number of image frames, the weights are preferably set to be 1 or very close to 1. However, in case more image frames than this minimum number of image frames are used lower weights can be used. For example, the weight may vary depending in where in the filed of view of the camera the object 220 is located. Image frames having the object 220 in a center portion of the field of view may be given a higher weight than image frames in which the object 220 just has entered the scene or just leaving the scene. As an example, returning to the sequence of image frames illustrated in connection with FIG. 2, a relatively high weight may be given to images frames 210*d-f* and a relatively low weight (or a weight of zero) may be given to image frames 210*a-c* and image frames 210*g-j*.

The combining function 134 may further be configured to select image frames among the sequence of image frames to be forming part of the series of image frames. Such selection may be performed such that image frames depicting the object 220 in a center portion of a field of view of the thermometric camera 100 are used for the series of image frames. Hence, image frames depicting just a portion of the object 220 and/or image frame in which the object 220 just has entered the scene or just leaving the scene may be excluded from the selection of image frames used for forming the stacked image of the object 220. As an example, returning to the sequence of image frames illustrated in connection with FIG. 2, the combining function 134 may select images frames 210*d-f* as constituting the series of image frames.

The circuitry 120 is further configured to execute a temperature determining function 136. The temperature determining function 136 is configured to determine the temperature of the object in motion from pixel values in the stacked image of the object 220. Hence, the object identifying function 132 and the combining function 134 are typically set to operate on pixel values in radiance/"raw" signal mode and the temperature determining function 136 then converts the pixel values to temperature readings.

The thermometric camera 100 may comprise a transceiver 150 through which the thermometric camera 100 is configured to communicate with other devices or services. For example, the transceiver 150 may be configured to send temperature readings to one or more other devices and/or services. The transceiver 150 may be configured to send/receive data over a data communication network configured to carry data between different devices. Typically, the data is digital data.

In connection with FIG. 3 a method 300 of determining a temperature of an object in motion using a thermometric camera will be discussed. The method 300 is preferably executed by a processor. Hence, it may be said that the method is a computer-implemented method. Some or all the steps of the method 300 may be performed by the thermometric camera 100 described above. However, it is equally realized that some or all of the steps of the method 300 may be performed by one or more other devices having similar functionality. The method 300 comprises the following steps. The steps may be performed in any suitable order.

Capturing, step S302, a sequence of image frames of the object 220 while the object 220 is moving. The capturing is made by a bolometer sensor of the thermometric camera 100. Such capturing is discussed in more detail above and reference is made to the above discussion in order to avoid undue repetition.

Identifying, step 304, an area corresponding to the object 220 in each image frame of a series of image frames among the sequence of image frames. Such identifying is discussed in more detail above and reference is made to the above discussion in order to avoid undue repetition.

Combining, step S306, the identified areas from each image frame in the series of image frames into a stacked image of the object 220. In the combining, pixel values in the stacked image of the object are estimated as a sum of pixel values of the corresponding pixels in the image frames in the series of image frames. Such combining is discussed in more detail above and reference is made to the above discussion in order to avoid undue repetition.

Determining, step S308, the temperature of the object 220 in motion from pixel values in the stacked image of the object. Such determining is discussed in more detail above and reference is made to the above discussion in order to avoid undue repetition.

In other words, the method of determining a temperature of an object in motion using a thermometric camera may be summarized as follows: 1) identify moving pixels and disregard stationary pixels. 2) estimate the speed of the object, e.g. by estimating the pixel speed. 3) calculate how many frames are needed to be summed together to fulfill the thermal time constant of the bolometer sensor of the thermometric camera based on the estimated pixel speed of the object and knowledge of the frame rate of the thermometric camera. All calculations may be made in radiance/"raw" signal mode and then converted back to temperature readings.

The person skilled in the art realizes that the present invention by no means is limited to what is explicitly described above. On the contrary, many modifications and variations are possible within the scope of the appended claims.

For example, blurring in the image frames captured by the thermometric camera due to motion of the object may be corrected for. This by estimating, from image frames in the sequence of image frames of the object, an angular distance moved during the total integration time, a, of the object in motion; estimating blurring of radiance due to motion using a module transfer function, $$MTF = \frac{\sin \pi \alpha f}{\pi \alpha f},$$

where f is a spatial frequency; and correcting pixels of the series of image frames based on the estimated blurring. The angular distance moved during the total integration time can be expressed as $\alpha = v \times t / D$, where v is the velocity, t the integration time and D is the distance between the object and the camera. D may also be scaled with the angle $\beta$ from the optical central axis, i.e. $D\cos\beta$. This angle $\beta$ is easily estimated as the field of view is known as a function of pixel position. By correcting for the motion blur, object detection may be made more reliable. This in turn may enable a more reliable temperature determination.

As hinted to above, there are limits to how fast the object may travel while still achieving a sufficiently reliable temperature reading. If the object moves too fast for a necessary number of frames to be collected before the object has moved out of the field of view of the thermometric camera, it may not be possible to determine the temperature of the object. This problem may be solved by employing two or more thermometric cameras along a trajectory of the object, such as along a railway track. A first series of image frames may be captured by a first thermometric camera as the object passes the first thermometric camera and a second series of image frames may be captured as the object passes the second thermometric camera. The first and second series of image frames can then be combined to form a sufficiently long series of image frames for combination into a stacked image.

Additionally, variations can be understood and effected by the skilled person in practicing the claimed invention, from a study of the drawings, the disclosure, and the appended claims.

The invention claimed is:

1. A method of determining a temperature of an object in motion using a stationary thermometric camera, the method comprising:

capturing a sequence of image frames of the object while the object is moving using a bolometer sensor of the stationary thermometric camera;

identifying an area corresponding to the object in each image frame of a series of image frames among the sequence of image frames;

combining the identified area from each image frame of the series of image frames among the sequence of image frames into a stacked image of the object, wherein pixel values in the stacked image of the object are estimated as a sum of pixel values of corresponding pixels image frames of the series of image frames among the sequence of image frames; and determining the temperature of the object in motion from the pixel values in the stacked image of the object.

2. The method according to claim 1, further comprising:

estimating, from image frames in the sequence of image frames of the object, a pixel velocity of the object in motion;

calculating, from the pixel velocity of the object in motion and a frame integration time, a pixel exposure time for the image frames in the sequence of image frames of the object; and determining a number of image frames to be used for the series of image frames among the sequence of image frames based on the calculated pixel exposure time and a thermal time constant of the bolometer sensor of the stationary thermometric camera.

3. The method according to claim 2, further comprising:

determining the thermal time constant of the bolometer sensor of the stationary thermometric camera by one or more of:

obtaining the thermal time constant of the bolometer sensor of the stationary thermometric camera given by the manufacturer of the bolometer sensor of the stationary thermometric camera, and a calibration of the stationary thermometric camera upon installation.

4. The method according to claim 1, further comprising:

selecting the series of image frames among the sequence of images as image frames depicting the object in a center portion of a field of view of the stationary thermometric camera.

5. The method according to claim 1, further comprising:

estimating, from image frames in the sequence of image frames of the object, an angular distance moved during a total integration time, $\alpha$, of the object in motion;

estimating blurring of radiance due to motion using a module transfer function, $$MTF = \frac{\sin \pi \alpha f}{\pi \alpha f},$$

where f is a spatial frequency; and correcting pixels of the series of image frames among the sequence of image frames based on the estimated blurring of radiance due to motion.

6. A non-transitory computer-readable storage medium having stored thereon computer code instructions being executable by a device having processing capabilities, wherein the computer code instructions when being executed are configured to instruct the device to:

receive a sequence of image frames of an object in motion captured using a bolometer sensor of a stationary thermometric camera;

identify an area corresponding to the object in each image frame of a series of image frames among the sequence of image frames;

combine the identified area from each image frame of the series of image frames among the sequence of image frames into a stacked image of the object, wherein pixel values in the stacked image of the object are estimated as a sum of pixel values of corresponding pixels in image frames of the series of image frames among the sequence of image frames; and determine a temperature of the object in motion from the pixel values in the stacked image of the object.

7. The non-transitory computer-readable storage medium according to claim 6, wherein the computer code instructions when being executed are further configured to instruct the device to:

estimate, from image frames in the sequence of image frames of the object, a pixel velocity of the object in motion;

calculate, from the pixel velocity of the object in motion and a frame integration time, a pixel exposure time for the image frames in the sequence of image frames of the object; and determine a number of image frames to be used for the series of image frames among the sequence of image frames based on the calculated pixel exposure time and a thermal time constant of the bolometer sensor of the stationary thermometric camera.

8. A thermometric camera for determining a temperature of an object in motion, the thermometric camera comprising:

a bolometer sensor configured to capture a sequence of image frames of the object while the object is moving; and circuitry configured to execute:

an object identifying function configured to identify an area corresponding to the object in each image frame of a series of image frames among the sequence of image frames;

a combining function configured to combine the identified area from each image frame of the series of image frames among the sequence of image frames into a stacked image of the object, wherein pixel values in the stacked image of the object are estimated as a sum of pixel values of corresponding pixels in image frames of the series of image frames among the sequence of image frames; and a temperature determining function configured to determine the temperature of the object in motion from the pixel values in the stacked image of the object.

9. The thermometric camera according to claim 8, wherein the combining function is further configured to:

based on image data in image frames in the sequence of image frames of the object, estimate a pixel velocity of the object in motion;

calculate, from the pixel velocity of the object in motion and a frame integration time, a pixel exposure time for the image frames in the sequence of image frames of the object; and determine, based on the calculated pixel exposure time and a thermal time constant of the bolometer sensor, a number of image frames to be used for the series of image frames among the sequence of image frames.

* * * * *